US 8,214,448 B2

(12) United States Patent
Cantu et al.

(10) Patent No.: US 8,214,448 B2
(45) Date of Patent: Jul. 3, 2012

(54) OPTIMIZED UTILIZATION OF DMA BUFFERS FOR INCOMING DATA PACKETS IN A NETWORK PROTOCOL

(75) Inventors: Edgar O. Cantu, Round Rock, TX (US); David R. Marquardt, Round Rock, TX (US); Jose German Rivera, Austin, TX (US); Thinh H. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 12/763,469

(22) Filed: Apr. 20, 2010

(65) Prior Publication Data
US 2011/0258282 A1    Oct. 20, 2011

(51) Int. Cl.
*G06F 15/16* (2006.01)
*G06F 15/173* (2006.01)

(52) U.S. Cl. ......... 709/212; 709/223; 709/224; 709/227

(58) Field of Classification Search .................. 709/225, 709/227, 234, 235, 250; 370/412, 428
See application file for complete search history.

(56) References Cited

U.S. PATENT DOCUMENTS

| | | | |
|---|---|---|---|
| 6,883,082 B2 | 4/2005 | Shami et al. | 711/202 |
| 6,907,042 B1 * | 6/2005 | Oguchi | 709/225 |
| 7,260,106 B2 * | 8/2007 | Yavatkar et al. | 370/428 |
| 7,533,176 B2 * | 5/2009 | Freimuth et al. | 709/227 |
| 7,822,053 B2 * | 10/2010 | Yasuda | 370/412 |
| 7,930,422 B2 * | 4/2011 | Freimuth et al. | 709/234 |
| 7,962,628 B2 * | 6/2011 | Freimuth et al. | 709/227 |
| 7,966,417 B2 * | 6/2011 | Aloni et al. | 709/235 |
| 8,108,560 B2 * | 1/2012 | Shankar et al. | 709/250 |
| 2008/0162859 A1 | 7/2008 | Christenson et al. | 711/170 |

* cited by examiner

*Primary Examiner* — Quang N. Nguyen
(74) *Attorney, Agent, or Firm* — Ido Tuchman; Libby Z. Toub

(57) ABSTRACT

A method, system and computer program product for facilitating network data packet management. In one embodiment, a controller is configured to receive data packets. Incoming data packets are stored in DMA mapped packet buffers. A time stamp is associated with the packet buffers. When the associated time stamp exceeds a defined threshold, the controller is configured to copy the packet buffers stored in DMA memory to non-DMA memory. Once copied, the DMA memory previously used to store the packet buffers is available to receive new data packets. The controller is configured to continue copying aged packet buffers to non-DMA memory until an unallocated amount DMA memory is reached.

17 Claims, 4 Drawing Sheets

OPTIMIZED UTILIZATION OF DMA BUFFERS FOR INCOMING DATA PACKETS IN A NETWORK PROTOCOL

BACKGROUND

The present invention relates to network data packet management, and more specifically to memory management of high performance devices that receive network data packets and store the packets in DMA mapped buffers.

DMA memory buffers are direct memory access buffers that are accessed by the device, for example, by the network protocol, instead of the CPU. DMA memory buffers are limited and predetermined, in some instances by the device driver or network protocol. Once data packets are stored in DMA memory, the DMA memory can not be reused to receive newer incoming data packets. Lack of available DMA memory available to receive incoming data packets may lead to data packets being dropped. Dropped data packets can result in retransmissions of incoming data packets which may cause congestion in the network. Copying contents of DMA memory to non-DMA memory will make DMA memory available to receive incoming data packets. The overhead of copying memory is expensive and may slow down transfer rates between communicating applications.

BRIEF SUMMARY OF INVENTION

An example embodiment of the present invention is a method for storing data packets in computer memory. The computer memory includes DMA memory reserved for dynamic memory access (DMA) and non-DMA memory that is not reserved for DMA access. The method includes a transferring step for transferring received data packets from a network adapter to packet buffers in the DMA memory. The packet buffers are associated with a time stamp of when the data packets are transferred to the packet buffers. Next, the packet buffers with associated time stamps older than a threshold age are iteratively copied to application buffers in the non-DMA memory if there is a shortage of available DMA memory to store additional data packets. An indicating step indicates that the DMA memory previously used to store the packet buffers is available to store the additional data packets.

Yet another example embodiment of the invention is a system for storing data packets in computer memory. The computer memory includes DMA memory reserved for dynamic memory access (DMA) and non-DMA memory that is not reserved for DMA access. The system includes a network adapter configured to transfer received data packets to packet buffers in the DMA memory. A controller is configured to associate with the packet buffers a time stamp of when the data packets are transferred to the packet buffers. Additionally, a buffer stealer is configured to iteratively copy the packet buffers with associated time stamps older than a threshold age to the application buffers in the non-DMA memory if there is a shortage of available DMA memory to store additional data packets. The buffer stealer is also configured to indicate that the DMA memory previously used to store the packet buffers is available to store the additional data packets.

Yet a further example embodiment of the invention is computer program product for storing data packets in computer memory. The computer program product includes computer readable program code configured transfer received data packets from a network adapter to packet buffers in the DMA memory, associate with the packet buffers a time stamp of when the data packets are transferred to the packet buffers, iteratively copy packet buffers with associated time stamps older than a threshold age to application buffers in the non-DMA memory if there is a shortage of available DMA memory to store additional data packets, and indicate that the DMA memory previously used to store the packet buffers is available to store the additional data packets.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-4.

Embodiments of the present invention provide support for copying the contents of DMA memory to non-DMA memory when there is a shortage of available DMA memory buffers. Broadly, data packets are received by a network adapter and are queued and stored in DMA memory to be accessed by an application or upper level component. An example embodiment of the present invention will proactively copy the data packets stored in packet buffers of DMA memory to packet buffers of non-DMA memory if there is a shortage of DMA memory buffers. For example, the number of available DMA memory buffers compared to the total number of existing DMA memory buffers may indicate a shortage of available DMA memory buffers. As discussed in greater detail below, in one embodiment of the invention the data packets in packet buffers of DMA memory are copied to packet buffers of non-DMA memory according to how long they have been sitting in the receive queue.

Figure 1:
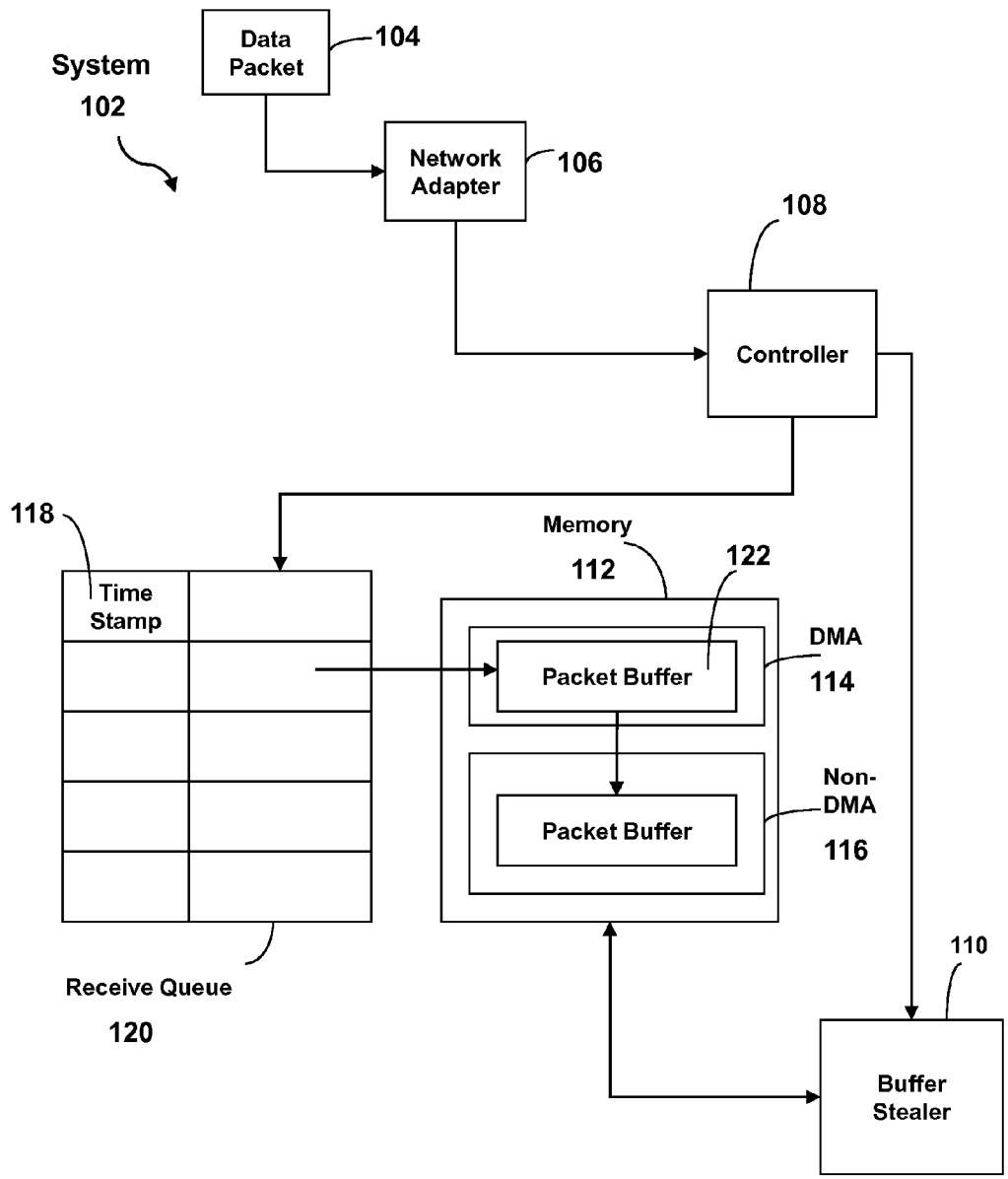
FIG. 1 shows an example system for storing data packets in computer memory, as contemplated by an embodiment of the present invention.

FIG. 1 illustrates an example system 102 for storing data packets in computer memory contemplated by the present invention. It is noted that the system 102 shown is just one example of various arrangements of the present invention and should not be interpreted as limiting the invention to any particular configuration.

The system 102 includes a network adapter 106 configured to receive data packets 104 over a network. The data packets can be, for example, data packets received by an application for further processing. The network adapter 106 transfers received data packets 104 to a receive queue 120 through Direct Memory Access (DMA) operations via a controller 108. In one embodiment, the receive queue 120 is a linked list of memory addresses associated with packet buffers 122 residing in memory 112.

The controller 108 is configured to associate with the packet buffers 122 a time stamp 118 of when the data packets 122 are transferred to the packet buffers 122 in memory 112. The memory 112 contains both DMA memory 114 and non-DMA memory 116.

Typically, there is a small amount of memory space in DMA memory 114 to store incoming packet buffers 112. The amount of DMA memory 114 is usually predetermined and configurable, for example, by a network protocol or system administrator. By contrast, the amount of non-DMA memory 116 available to store packet buffers 122 is generally much greater than DMA memory 114.

When data packets 104 are received they are stored in DMA memory 114, for example, for direct access by an application. Once the data packet 104 is stored in a packet buffer 122 residing in DMA memory 114 that DMA memory location is no longer available to receive additional data packets 104. Moreover, if an application is not reading from its receive queue 120 fast enough, its data packets 104 will remain in the packet buffer 122 of the DMA memory 114 for an extended period of time and prevent new packets from occupying the used DMA memory space. This may cause a storage of DMA memory 114 for storing new data packets 104 and can result in the dropping of data packets 104 or retransmissions of incoming data packets 104.

If such a scarcity of DMA memory 114 to store new data packets 104 exists, then packet buffers 122 residing in DMA memory 114 are copied from DMA memory 114 to non-DMA memory 116. In a particular embodiment, the controller 108 determines if a DMA memory shortage exists and initiates the copy process. Once the packet buffers 122 are copied, the DMA memory 114 previously used to store the packet buffers 122 is released and made available to store new data packets 104. In one embodiment, a buffer stealer 110 performs this task.

The buffer stealer 110 is a background thread configured to iteratively copy the packet buffers 122 residing in memory 112 from DMA memory 114 to non-DMA memory 116 if their associated time stamp 118 is older than a configurable threshold age and there is a shortage of DMA memory 114 to store additional incoming data packets 104. After an incoming data packet 104 is copied from a packet buffer in DMA memory 114 to non-DMA memory 116, the DMA memory 114 is indicated as available to receive additional incoming data packets 104.

The buffer stealer 110 is configured to continue searching through the receive queue 120 and check the data packets 104 for a time stamp 118 that exceeds the predetermined threshold age. The predetermined threshold age is a configurable constant that may be configured, for example, by a system administrator. The buffer stealer 110 is further configured to stop checking the threshold age of received data packets 104 when a target value of available DMA memory 114 is reached. Thus, the buffer stealer 110 may continue moving packet buffers 122 from DMA memory 114 to non-DMA memory 116 until the shortage of DMA memory 114 is relieved.

Figure 2:
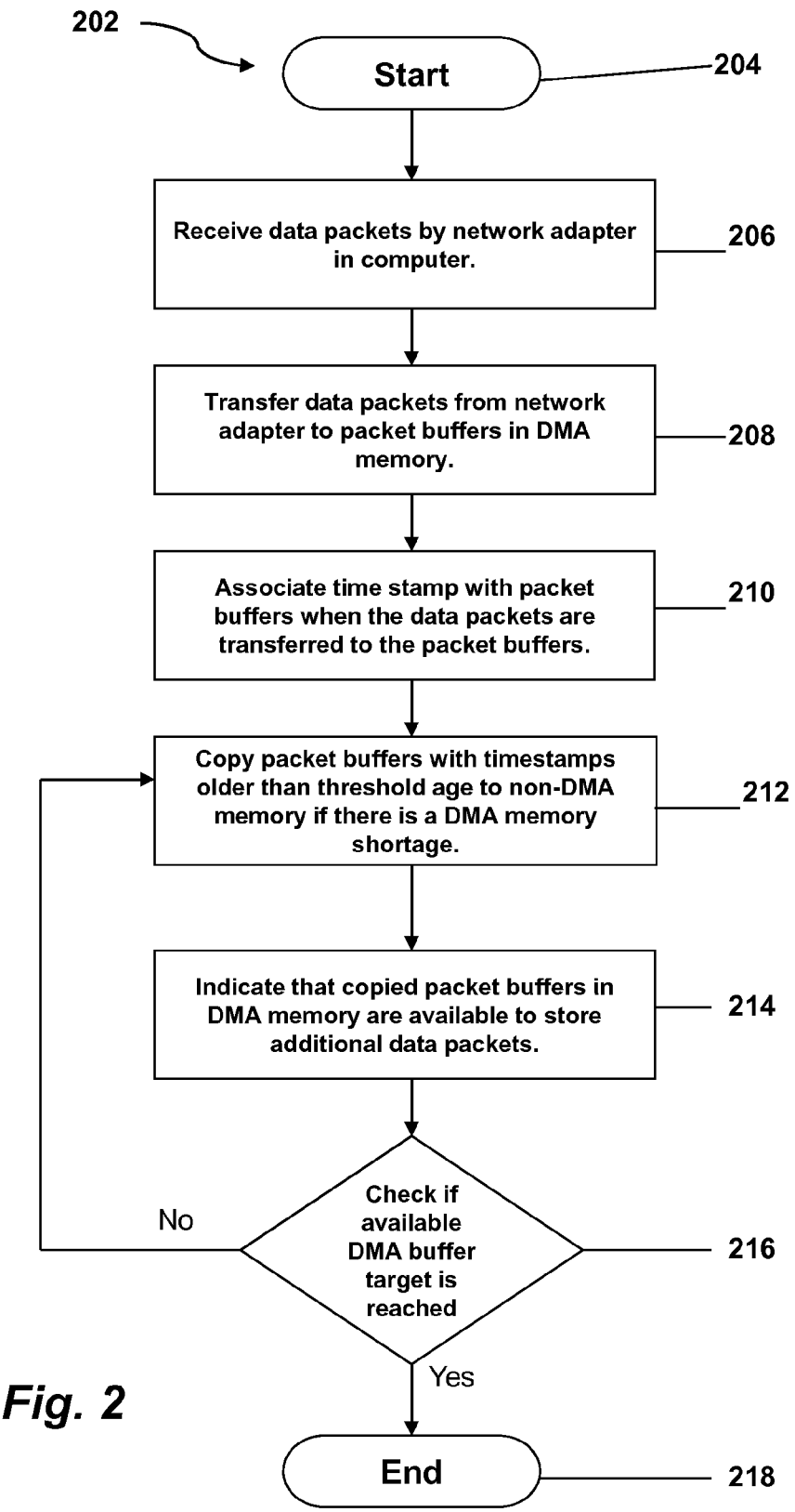
FIG. 2 shows an example method for storing data packets in computer memory.

Another embodiment of the invention is a method for storing data packets in computer memory, which is now described with reference to flowchart 202 of FIG. 2. The method begins at Block 204 and includes receiving a data packet by a network adapter at Block 206. As discussed above, the data packets can include, for example, data for executing applications to process.

After Block 206 is completed, control passes to Block 208. At Block 208, data packets are transferred from a network adapter to packet buffers in DMA memory. In one embodiment of the invention, a controller transfers the data packets to DMA memory without involvement of a computer processor using direct memory access (DMA).

After Block 208 is completed, control passes to Block 210. At Block 210 a time stamp is associated with the packet buffers when the data packets are transferred to the packet buffers. It is contemplated that the time stamp may be stored at the receive queue (as shown in FIG. 1) or at the packet buffer.

After Block 210 is completed, control passes to Block 212. At Block 212 the method is configured to copy packet buffers with associated timestamps that are older than a threshold age if there is a shortage of DMA memory.

The packet buffers are copied from DMA memory to non-DMA memory so additional received data packets can be stored in DMA memory.

After Block 212 is completed, control passes to Block 214. At Block 214, after a packet buffer residing in DMA memory has been copied to non-DMA memory, the corresponding DMA memory is indicated as available to receive additional data packets.

After Block 214 is completed, control passes to Block 216. At Block 216 the method checks if the available DMA buffer target has been reached. If the target number of available DMA buffers has not been reached control passes back to Block 212 to copy more packet buffers with associated timestamps that are older than a threshold age. If the target number of available DMA buffers has been reached control passes to Block 218.

The method ends at Block 218 until method 202 is reactivated to facilitate the availability of DMA buffers.

Figure 3:
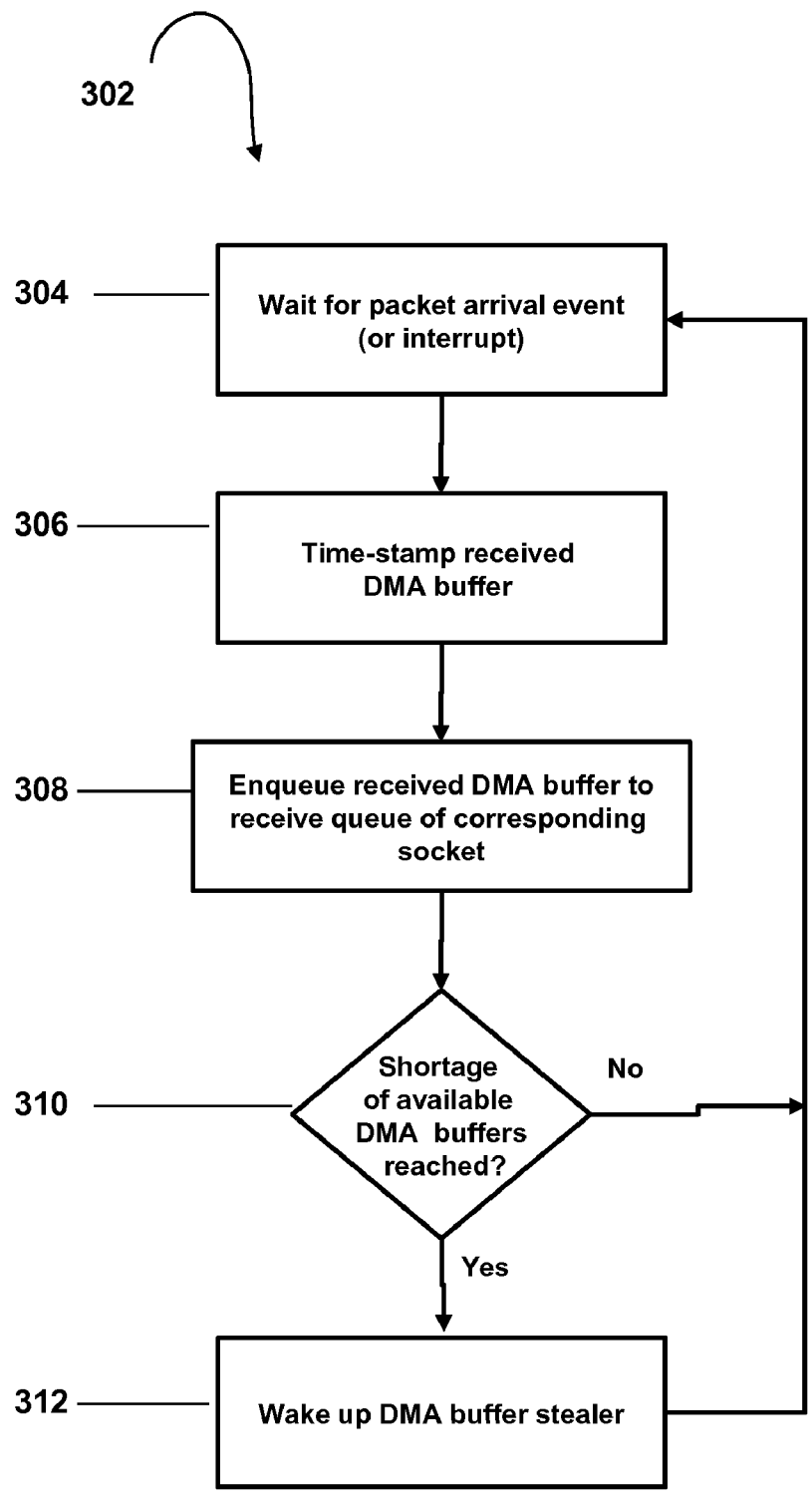
FIGS. 3-4 show an example flowchart for receiving data packets and copying DMA memory buffers to non-DMA memory buffers if there is a shortage of available DMA memory buffers, as contemplated by an embodiment of the present invention.

Another embodiment of the invention is a foreground process for storing data packets in computer memory, which is now described with reference to flowchart 302 of FIG. 3. The process begins at Block 304 and includes waiting for an arrival event, for example, an interrupt that signals the arrival of a data packet. As discussed above, the data packets can include, for example, data for executing applications to process.

After Block 304 is completed, control passes to Block 306. At Block 306 the received data packet in the DMA buffer is time stamped. It is contemplated that the time stamp may be stored at the receive queue (as shown in FIG. 1) or at the packet buffer.

After Block 306 is completed, control passes to Block 308. At Block 308 the received data packet residing in the DMA buffer is enqueued to a receive queue of a corresponding socket. As discussed above the receive queue may be a linked list of memory addresses associated with a corresponding socket of memory. The corresponding sockets, for example, may be created by applications running in the host to allow talking to remote applications.

After Block 308 is completed, control passes to Block 310. At Block 310 the process checks if the shortage of available DMA buffers is reached. If the shortage available DMA buffers has not been reached control passes back to Block 304 to wait for another packet arrival event. If the shortage of available DMA buffers has been reached control passes to Block 312.

At Block 312 the process wakes up a buffer stealer process. In one embodiment of the invention, the buffer stealer is a background thread that processes the copying of DMA buffers to non-DMA buffers out of line.

Figure 4:
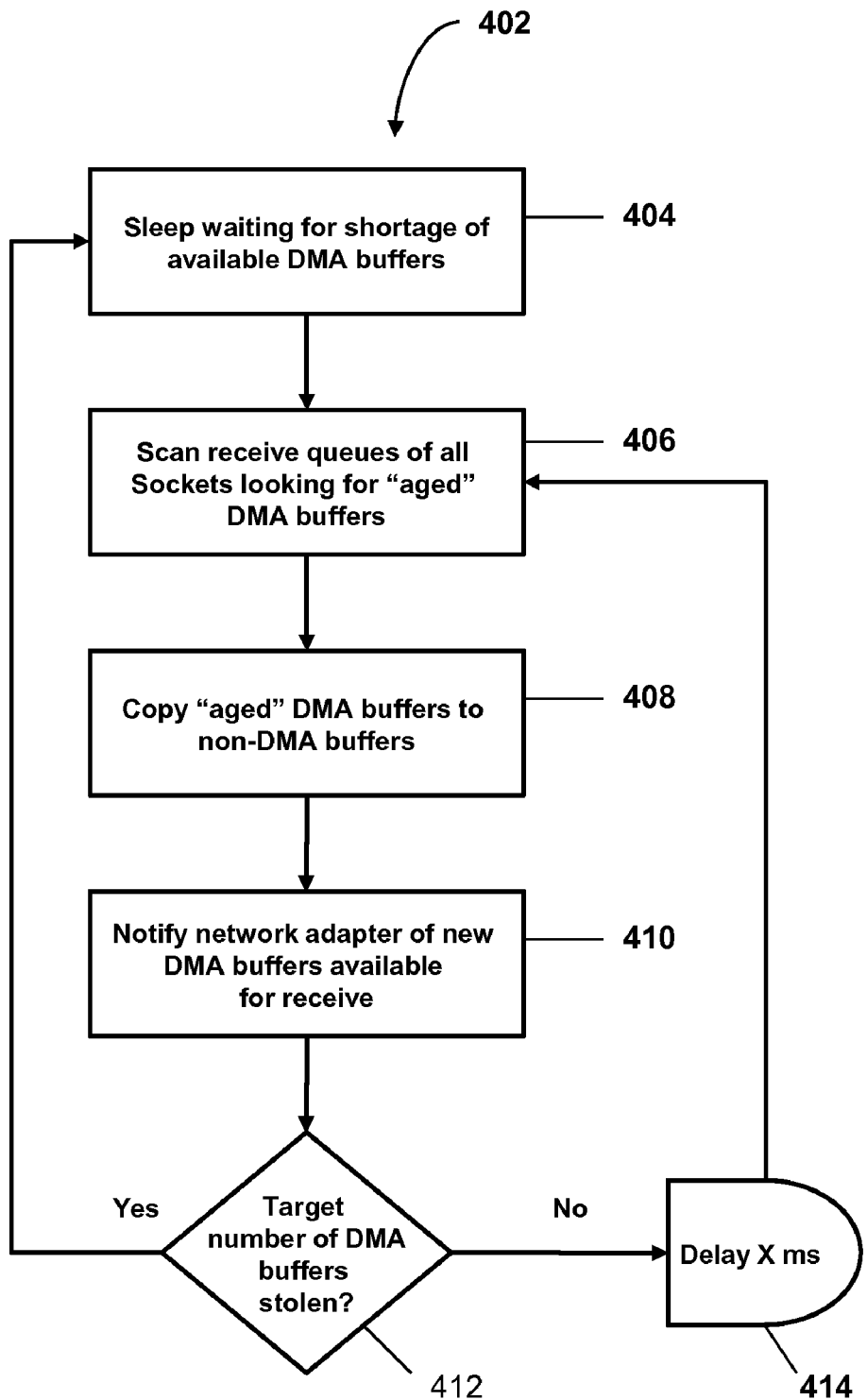

Another embodiment of the invention is the buffer stealer background process, which is now described with reference to flowchart 402 of FIG. 4. The process begins at Block 404 and includes waiting for a shortage of available DMA buffers, for example, the shortage of available DMA buffers is an event that activates process 402.

After Block 404 is completed, control passes to Block 406. At Block 406 the process scans all receive queues of all corresponding sockets for "aged" DMA buffers. A DMA buffer is "aged", for example, when the received data packet remains in the DMA buffer too long and is not accessed by the corresponding application. Data packets that remain in DMA buffers without being accessed by the corresponding application may result in dropped data packets and retransmissions. Determining which DMA buffers are "aged" may be accomplished, for example as discussed above, by time stamping when data packets are received in DMA buffer memory. It is typically more efficient to copy the DMA buffers that are not being accessed by the application rather than arbitrarily selecting a DMA buffer or the DMA buffer that has received data.

After Block 406 is completed, control passes to Block 408. At Block 408 the aged DMA buffers are copied to non-DMA buffers, as detailed above.

After Block 408 is completed, control passes to Block 410. At Block 410 the process notifies the network adapter that the DMA buffers that have been copied to non-DMA buffers are now available to receive new incoming data packets.

After Block 410 is completed, control passes to Block 412. At Block 412 the process checks if the target number of DMA buffers has been copied to non-DMA buffers. If the target number of DMA buffers has been copied from DMA memory to non-DMA memory control passes to Block 402 and waits for a shortage of available DMA buffers, i.e., reactivated by process 302 in FIG. 3, as discussed above. If the target number of DMA buffers has not been copied from DMA memory to non-DMA memory control passes to Block 414.

At Block 414 the process is delayed for a configured time period before passing control back to Block 406. For example, the process may wait a few milliseconds before passing control back to Block 406 to scan all receive queues of all sockets to look for "aged" DMA buffers.

The necessity of copying DMA buffers to non-DMA buffers to make DMA buffers available will slow down the transfer rate between applications. However, having the process of copying DMA buffers to non-DMA buffers running as a background thread is an efficient solution because the process is only activated when necessary. For example, the buffer stealer thread process of 402 in FIG. 4, is only activated when woken up by the process 302 of FIG. 3.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. Thus, the claims should be construed to maintain the proper protection for the invention first described.

What is claimed is:

1. A method for storing data packets in computer memory, the computer memory including DMA memory reserved for dynamic memory access (DMA) and non-DMA memory that is not reserved for DMA access, the method comprising:
   transferring received data packets from a network adapter to packet buffers in the DMA memory;
   associating with the packet buffers a time stamp of when the data packets are transferred to the packet buffers;
   iteratively copying packet buffers with associated time stamps older than a threshold age to application buffers in the non-DMA memory if there is a shortage of available DMA memory to store additional data packets; and
   indicating that the DMA memory previously used to store the packet buffers is available to store the additional data packet;
   wherein iteratively copying the packet buffer of the DMA memory to non-DMA memory is terminated when a DMA buffer target value of available DMA memory to store the additional data packets is reached.

2. The method according to claim 1, further comprising receiving data packets by the network adapter in a computer.

3. The method according to claim 1, wherein associating with the packet buffers the time stamp of when the data packets are transferred to the packet buffers includes time stamping the DMA buffers when the DMA buffers are created.

4. The method according to claim 1, wherein the threshold age is a predetermined constant.

5. The method according to claim 1, wherein the shortage of available DMA memory is a predetermined constant.

6. The method according to claim 1, wherein the DMA buffer target value is a predetermined constant.

7. A system for storing data packets in computer memory, the computer memory including DMA memory reserved for dynamic memory access (DMA) and non-DMA memory that is not reserved for DMA access, the system comprising:
   a network adapter configured to transfer received data packets to packet buffers in the DMA memory;
   a controller configured to associate with the packet buffers a time stamp of when the data packets are transferred to the packet buffers; and
   a buffer stealer configured to:
      iteratively copy the packet buffers with associated time stamps older than a threshold age to the application buffers in the non-DMA memory if there is a shortage of available DMA memory to store additional data packets; and
      indicate that the DMA memory previously used to store the packet buffers is available to store the additional data packets;
   wherein the controller is further configured to terminate the buffer stealer when a DMA buffer target value of available DMA memory to store the additional data packets is reached.

8. The system according to claim 7 wherein the network adapter is configured to receive the data packets in a computer.

9. The system according to claim 7 wherein the controller is further configured to time stamp the DMA buffers when the DMA buffers are created.

10. The system according to claim 7 wherein the controller is further configured to define the threshold age as a constant.

11. The system according to claim 7 wherein the controller is further configured to define the shortage of available DMA memory as a constant.

12. The system according to claim 7, wherein the controller is configured to define the DMA buffer target value as a constant.

13. A computer program product for storing data packets in computer memory, the computer memory including DMA memory reserved for dynamic memory access (DMA) and non-DMA memory that is not reserved for DMA access, the computer program product comprising:
   a non-transitory computer readable storage medium having computer readable program code embodied therewith, the computer readable program code configured to:
   transfer received data packets from a network adapter to packet buffers in the DMA memory;
   associate with the packet buffers a time stamp of when the data packets are transferred to the packet buffers;
   iteratively copy packet buffers with associated time stamps older than a threshold age to application buffers in the non-DMA memory if there is a shortage of available DMA memory to store additional data packets; and
   indicate that the DMA memory previously used to store the packet buffers is available to store the additional data packets;
   wherein iteratively copy the packet buffer of the DMA memory to non-DMA memory is terminated when a DMA buffer target value of available DMA memory to store the additional data packets is reached.

14. The computer program product according to claim 13, further configured to receive the data packets by the network adapter in a computer.

15. The computer program product according to claim 13, further configured to associate with the packet buffers the time stamp of when the data packets are transferred to the packet buffers includes time stamping the DMA buffers when the DMA buffers are created.

16. The computer program product according to claim 13, further configured to define the threshold age as a constant and define the shortage as a constant.

17. The computer program product according to claim 13, further configured to define the DMA buffer target value as a constant.

* * * * *